US012769668B2

(12) United States Patent
Chang

(10) Patent No.: US 12,769,668 B2
(45) Date of Patent: Oct. 20, 2026

(54) METHOD AND APPARATUS FOR PERFORMING DICTIONARY-BASED LOSSLESS CACHE LINE COMPRESSION BY USING PATTERNS THAT ARE SET WITH THE AID OF ARTIFICIAL INTELLIGENCE

(71) Applicant: MEDIATEK INC., Hsinchu City (TW)

(72) Inventor: Shu-Hsin Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 7 days.

(21) Appl. No.: 18/953,100

(22) Filed: Nov. 20, 2024

(65) Prior Publication Data

US 2026/0140883 A1 May 21, 2026

(51) Int. Cl.
*G06F 12/00* (2006.01)
*G06F 12/0893* (2016.01)

(52) U.S. Cl.
CPC .. *G06F 12/0893* (2013.01); *G06F 2212/3042* (2013.01); *G06F 2212/305* (2013.01); *G06F 2212/401* (2013.01)

(58) Field of Classification Search
CPC ......... G06F 12/0893; G06F 2212/3042; G06F 2212/305; G06F 2212/401
See application file for complete search history.

(56) References Cited

U.S. PATENT DOCUMENTS

| | | | | |
|---|---|---|---|---|
| 7,426,612 | B2 * | 9/2008 | Rudd | G06F 12/0848 711/125 |
| 12,298,906 | B2 * | 5/2025 | Xie | G06F 12/0811 |
| 2015/0186309 | A1 * | 7/2015 | Lee | G06F 13/1678 710/307 |
| 2016/0147777 | A1 * | 5/2016 | Gade | G06F 16/116 718/104 |
| 2017/0103019 | A1 * | 4/2017 | Rahme | G06F 3/0622 |
| 2019/0073799 | A1 * | 3/2019 | Phatak | G06T 17/00 |
| 2022/0197642 | A1 * | 6/2022 | Wang | G06F 9/383 |
| 2025/0038765 | A1 * | 1/2025 | Galvin | G06F 21/6245 |
| 2025/0240439 | A1 * | 7/2025 | Ibrahim | H04N 19/70 |

FOREIGN PATENT DOCUMENTS

CN 117611015 A * 2/2024 ....... G06Q 10/06395

* cited by examiner

*Primary Examiner* — Shawn X Gu
*Assistant Examiner* — Mohammad S Hasan
(74) *Attorney, Agent, or Firm* — Winston Hsu

(57) ABSTRACT

A cache device includes a cache memory and a compression circuit. The cache memory includes a plurality of cache lines. The compression circuit performs a dictionary-based lossless compression upon a compression unit according to at least one pattern selected from a plurality of patterns, and stores a compression result of the compression unit into one of the plurality of cache lines, wherein the plurality of patterns are set with the aid of artificial intelligence (AI).

18 Claims, 4 Drawing Sheets

PAT₁-PAT_N

| | Pattern | Description | Compressed size (bits) (original : 32 bits) | Required meta data (all 4 bits) |
|---|---|---|---|---|
| ① | zzzz | All zero | 0 | 0000 |
| ① | 1111 | All f | 0 | 0001 |
| ② | mmmm(0) | Match previous 4 bytes | 0 | 0010 |
| ② | mmmm(1) | Match before previous 4 bytes | 0 | 0011 |
| ① | zzzx | 1-3 bytes = 0 | 8 | 0100 |
| ① | xzzz | 2-4 bytes = 0 | 8 | 0101 |
| ① | rrrr | 1-4 bytes the same | 8 | 0110 |
| ② | mmmx(0) | 1-3 bytes match previous 3 bytes | 8 | 0111 |
| ② | mmmx(1) | 1-3 bytes match before previous 3 bytes | 8 | 1000 |
| ① | zzzx | 1-2 bytes = 0 | 16 | 1001 |
| ① | zxzx | 1,3 bytes = 0 | 16 | 1010 |
| ① | 11xx | 1-2 bytes = f | 16 | 1011 |
| ① | xxzz | 3-4 bytes = 0 | 16 | 1100 |
| ② | mmxx(0) | 1-2 bytes match previous 2 bytes | 16 | 1101 |
| ② | mmxx(1) | 1-2 bytes match before previous 2 bytes | 16 | 1110 |
| | xxxx | Uncompressed | 32 | 1111 |

① Compress within unit
② Compress across units

FIG. 2

METHOD AND APPARATUS FOR PERFORMING DICTIONARY-BASED LOSSLESS CACHE LINE COMPRESSION BY USING PATTERNS THAT ARE SET WITH THE AID OF ARTIFICIAL INTELLIGENCE

BACKGROUND

The present invention relates to data compression, and more particularly, to a method and apparatus for performing a dictionary-based lossless cache line compression by using patterns that are set with the aid of artificial intelligence.

Transferring data from and to the main storage (e.g., off-chip memory) has an elevated cost. Because of that, it has become standard for current systems to implement multiple levels of progressively smaller memories (caches) with proportional latencies and energy cost. Unfortunately, whenever a cache miss occurs, the next cache level or the main storage must be accessed, resulting in degraded performance inevitably. Thus, there is a need for an innovative design which is capable of increasing the cache capacity as well as reducing the bandwidth utilization between the cache and the main storage.

SUMMARY

One of the objectives of the claimed invention is to provide a method and apparatus for performing a dictionary-based lossless cache line compression by using patterns that are set with the aid of artificial intelligence.

According to a first aspect of the present invention, an exemplary cache device is disclosed. The exemplary cache device includes a cache memory and a compression circuit. The cache memory includes a plurality of cache lines. The compression circuit is configured to perform a dictionary-based lossless compression upon a compression unit according to at least one pattern selected from a plurality of patterns, and store a compression result of the compression unit into one of the plurality of cache lines, wherein the plurality of patterns are set with the aid of artificial intelligence (AI).

According to a second aspect of the present invention, an exemplary cache line compression method is disclosed. The exemplary cache line compression method includes: setting a plurality of patterns with the aid of artificial intelligence (AI); performing a dictionary-based lossless compression upon a compression unit according to at least one pattern selected from the plurality of patterns; and storing a compression result of the compression unit into one of a plurality of cache lines in a cache memory.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating one possible setting of 16 patterns $PAT_1$-$PAT_N$ (N=16) used by the dictionary-based lossless compression performed at the compression circuit according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
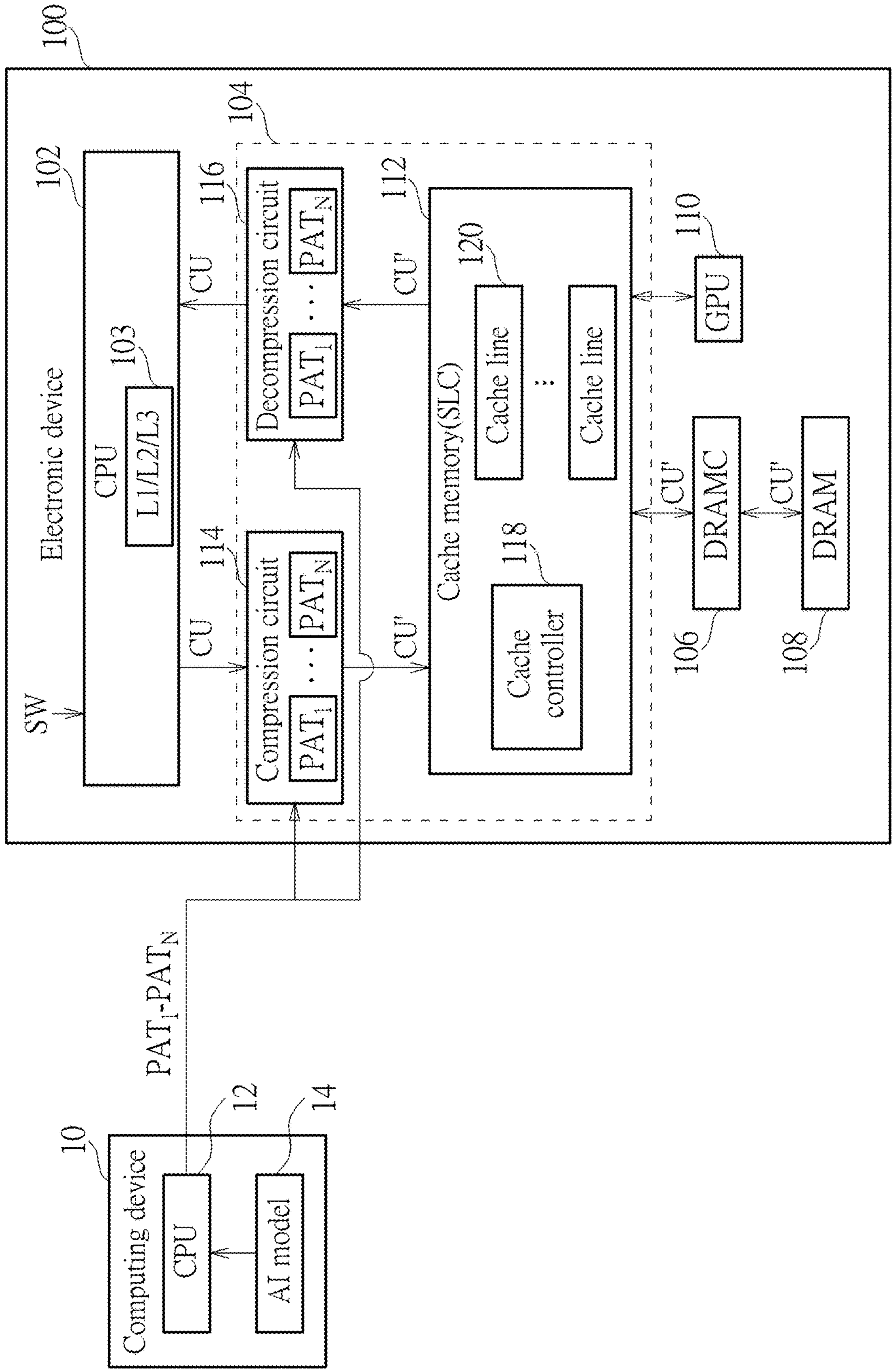
FIG. 1 is a diagram illustrating an electronic device using the proposed cache line compression scheme according to an embodiment of the present invention.

FIG. 1 is a diagram illustrating an electronic device using the proposed cache line compression scheme according to an embodiment of the present invention. By way of example, but not limitation, the electronic device 100 may be a mobile device such as a cellular phone or a tablet. In this embodiment, the electronic device 100 may include a central processing unit (CPU) 102, a cache device 104, a dynamic random access memory (DRAM) controller (labeled by "DRAMC") 106, a DRAM 108, and a graphics processing unit (GPU) 110. The CPU 102 is configured to load and execute software SW such as an operating system (OS) and an application, and includes a CPU cache (labeled by "L1/L2/L3") 103 that may include an L1 cache, an L2 cache, and an L3 cache. The cache device 104 supports the proposed cache line compression scheme, and may include a cache memory 112, a compression circuit 114, and a decompression circuit 116. In this embodiment, the cache memory 112, the compression circuit 114 and the decompression circuit 116 are illustrated as individual circuit blocks. However, this is for illustrative purposes only, and is not meant to be a limitation of the present invention. The present invention has no limitations on the integration of circuits within the cache device 104. In practice, the cache device 104 may be any hardware device having a compression function, a decompression function and a cache function. In one alternative design, the cache device 104 may have all of the cache memory 112, the compression circuit 114 and the decompression circuit 116 integrated into a single circuit block. In another alternative design, the cache device 104 may have two of the cache memory 112, the compression circuit 114 and the decompression circuit 116 integrated into a single circuit block. These alternative designs all fall within the scope of the present invention. To put it simply, any cache device having a compression function, a decompression function and a cache function falls within the scope of the present invention.

The cache device 104 is external to the CPU 102. For example, the cache memory 112 may act as a system level cache (SLC) (also called a last level cache (LLC)), and may include a cache controller 118 and a plurality of cache lines 120. By way of example, but not limitation, each cache line may be implemented using an on-chip memory such as a static random access memory (SRAM), and the cache line size may be 64 bytes. It should be noted that only the components pertinent to the present invention are illustrated in FIG. 1. In practice, the electronic device 100 may include additional components to achieve other designated functions.

The compression circuit 114 is a compression engine configured to perform a dictionary-based lossless compression upon a compression unit (e.g., a data block) CU according to at least one pattern selected from a plurality of patterns $PAT_1$-$PAT_N$, and store a compression result (e.g., a compressed data block) CU' of the compression unit CU into one of the cache lines 120. Since the lossless compression is employed by the compression circuit 114, the decompression circuit 116 is a decompression engine that can recover the original compression unit CU from applying decompression to the compression result CU' read from the cache memory 112. For example, the decompression circuit 116 may provide a decompression result to the CPU 102 that requests the compression unit CU which is not available in the CPU cache 103. Since the present invention is focused on data compression and its benefits, further description of the decompression circuit 116 is omitted here for brevity.

In some embodiments of the present invention, the dictionary-based lossless compression employed by the compression circuit 114 may be a Base-Delta-Immediate (BDI) algorithm based compression or a Frequent Pattern Compression (FPC) algorithm based compression. For example, a compression algorithm of the dictionary-based lossless compression employed by the compression circuit 114 may be similar to an FPD-D (FPD with limited dictionary) algorithm. However, this is for illustrative purposes only, and is not meant to be a limitation of the present invention.

Figure 3:
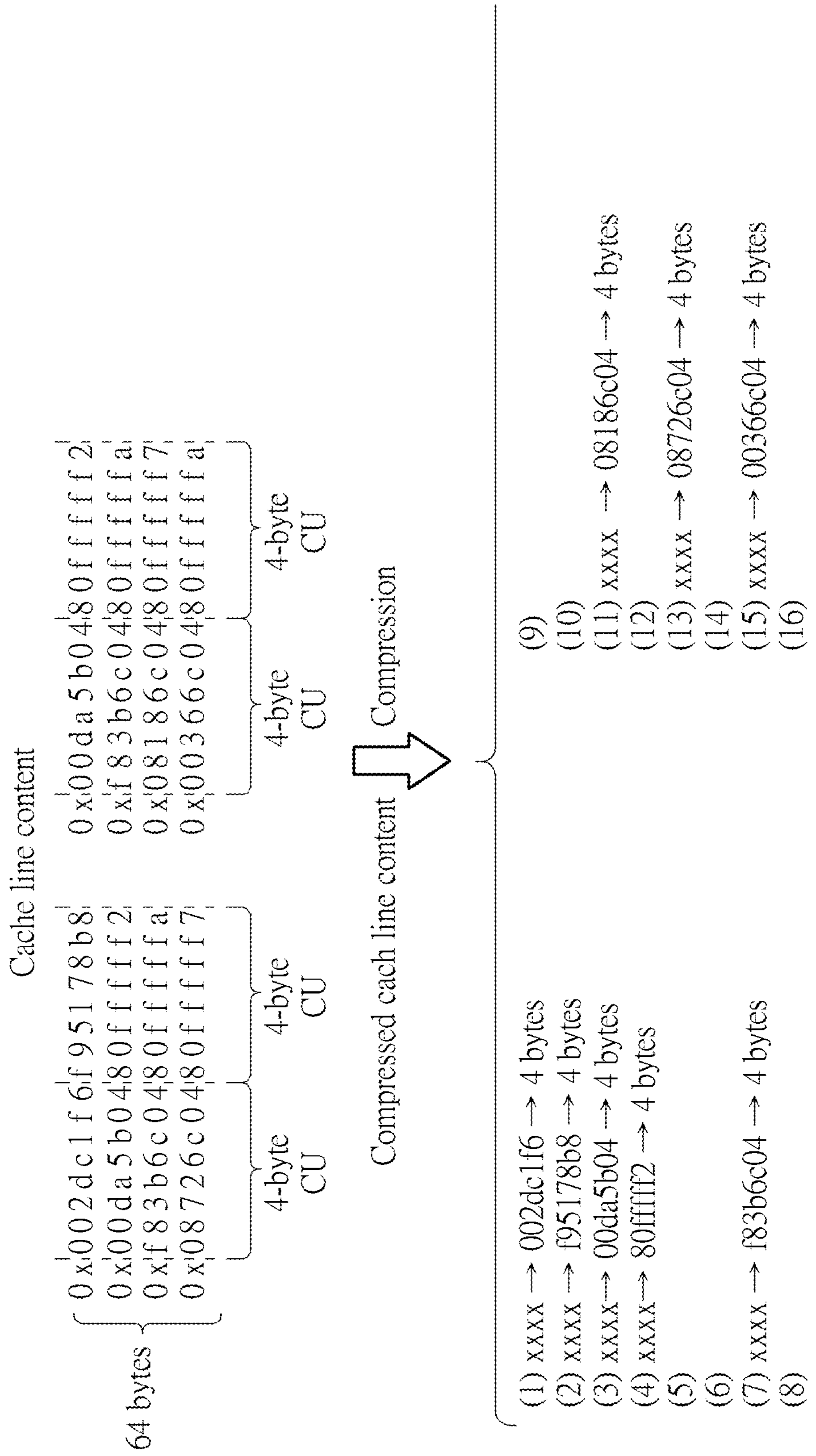
FIG. 3 is a diagram illustrating compression results of 4-byte compression units included in one 64-byte cache line content according to an embodiment of the present invention.

An example of the dictionary-based lossless compression employed by the compression circuit 114 is shown in FIG. 2 and FIG. 3. FIG. 2 is a diagram illustrating one possible setting of 16 patterns $PAT_1$-$PAT_N$ (N=16) used by the dictionary-based lossless compression performed at the compression circuit 114 according to an embodiment of the present invention. FIG. 3 is a diagram illustrating compression results of 4-byte compression units included in one 64-byte cache line content according to an embodiment of the present invention. For better comprehension of the dictionary-based lossless compression, it is assumed that one compression unit has 32 bits (4 bytes). The patterns $PAT_1$-$PAT_N$ (N=16) may include some patterns for intra-unit compression (which is focused on a current compression unit itself) and some patterns for inter-unit compression (which is focused on difference between a current compression unit and a previous compression unit). The compression result of each compression unit may include compressed content (0~32 bits) and meta data (4 bits), where the 4-bit meta data is indicative of the compression configuration such as an index value of the selected pattern. One 64-byte cache line content can be partitioned into sixteen 4-byte CUs that are compressed one by one. For example, the $1^{st}$ 4-byte CU "002dc1f6" is compressed using the compression pattern "xxxx", resulting in a 4-byte compressed content that is the same as the current CU "002dc1f6"; the $2^{nd}$ 4-byte CU "f95178b8" is compressed using the compression pattern "xxxx", resulting in a 4-byte compressed content that is the same as the current CU "f95178b8"; the $3^{rd}$ 4-byte CU "00da5b04" is compressed using the compression pattern "xxxx", resulting in a 4-byte compressed content that is the same as the current CU "00da5b04"; the $4^{th}$ 4-byte CU "80fffff2" is compressed using the compression pattern "xxxx", resulting in a 4-byte compressed content that is the same as the current CU "80fffff2"; the $7^{th}$ 4-byte CU "f83b6c04" is compressed using the compression pattern "xxxx", resulting in a 4-byte compressed content that is the same as the current CU "f83b6c04"; the $11^{th}$ 4-byte CU "08186c04" is compressed using the compression pattern "xxxx", resulting in a 4-byte compressed content that is the same as the current CU "08186c04"; the $13^{th}$ 4-byte CU "08726c04" is compressed using the compression pattern "xxxx", resulting in a 4-byte compressed content that is the same as the current CU "08726c04"; and the $15^{th}$ 4-byte CU "00366c04" is compressed using the compression pattern "xxxx", resulting in a 4-byte compressed content that is the same as the current CU "00366c04". It should be noted that the compression illustrated in FIG. 3 is for illustrative purposes only, and is not meant to be a limitation of the present invention. In practice, the pattern combination $PAT_1$-$PAT_N$ is determined with the AID of artificial intelligence, and may be different from that illustrated in FIG. 3.

The compression ratio highly depends on the selection of the limited dictionary (e.g., 16 patterns $PAT_1$-$PAT_N$ (N=16) employed by the compression circuit 114). In some embodiments of the present invention, the cache device 104 (particularly, cache controller 118 of cache memory 112) further transfers the compression result CU' of the compression unit CU from the cache memory (e.g., SLC) 112 to a hardware device. For example, the hardware device may be the DRAM 108, and the cache device 104 transfers the compression result CU' to the DRAM 108 through the DRAM controller 106. For another example, the hardware device may be the GPU 110 that also shares the cache memory (e.g., SLC) 112.

Figure 4:
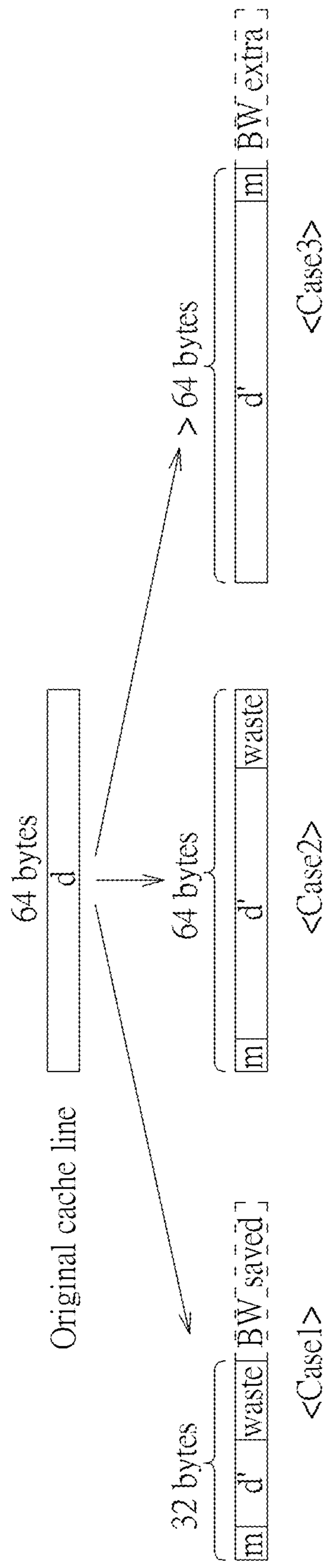
FIG. 4 is a diagram illustrating different cases resulting from cache line compression.

It is observed that content compression does not equate bandwidth (BW) reduction between the cache device 104 and the hardware device. Taking the DRAM 108 for example, the BW reduction needs to align with the DRAM burst length (e.g., 32 bytes). FIG. 4 is a diagram illustrating different cases resulting from cache line compression. Suppose that the cache line content d is 64 bytes. In a first case where a size of compressed content d' and associated meta data m is smaller than 32 bytes, 32-byte BW can be saved when the compression result m+d' (m+d'<32 bytes) is transferred to the DRAM 108 according to a 32-byte DRAM burst length. In a second case where a size of compressed content d' and associated meta data m is larger than 32 bytes and smaller than 64 bytes, the cache capacity can benefit from content compression, but no BW saving can be achieved under the 32-byte DRAM burst length. In a third case where a size of compressed content d' and associated meta data m is larger than 64 bytes, none of the cache capacity and DRAM BW can benefit from content compression, and compression of this cache line should be skipped. Compressing all cache line contents to generate compression results each being slightly smaller than 32 bytes is a better choice than compressing some cache line contents to generate compression results each being much smaller than 32 bytes and compressing remaining cache line contents to generate compression results each being larger than 32 bytes. Hence, if the patterns $PAT_1$-$PAT_N$ are not properly set, most compression results may exceed the 32-byte DRAM burst length. In other words, the patterns $PAT_1$-$PAT_N$ should be properly set to achieve cache expansion as well as BW saving. However, selecting a target combination of patterns $PAT_1$-$PAT_N$ from millions of candidate pattern combinations (e.g., $2^{160}$ pattern combinations) cannot be done by manpower. To address this issue, the present invention proposes setting the patterns $PAT_1$-$PAT_N$ with the aid of artificial intelligence (AI). In other words, the patterns $PAT_1$-$PAT_N$ are trained patterns obtained from machine learning.

As shown in FIG. 1, a computing device 10 includes a CPU 12 that is configured to determine the patterns $PAT_1$-$PAT_N$ through an AI model 14 such as a deep learning model. In one embodiment of the present invention, the AI model 14 may be trained using reinforcement learning, and may further take a hardware constraint of a hardware device (e.g., DRAM 108 or GPU 110) into consideration. For example, the DRAM burst length (e.g., 32 bytes) of the DRAM 108 is considered by the proposed AI-assisted compression pattern generation. Hence, when the AI model 14 is trained using reinforcement learning, the reward may be set by 1 for size<=32 bytes, the reward may be set by 0 for size<=64 bytes, and the reward may be set by −1 for size>64 bytes. After the AI model 14 is trained for sufficient contents, best AI-suggested compression patterns can be generated and then written into the compression circuit 114 and the decompression circuit 116. Since a person skilled in the art can readily understand principles of reinforcement learning, further description is omitted here for brevity. The hardware constraint of the hardware device (e.g., DRAM 108 or GPU 110) is considered by the AI-assisted compression pattern generation. In this way, the AI-suggested patterns $PAT_1$-$PAT_N$ can best satisfy the cache expansion requirement and the BW saving requirement.

In some embodiments, the patterns $PAT_1$-$PAT_N$ may be determined by AI that takes a hardware constraint of a hardware device (e.g., DRAM 108 or GPU 110) and additional constraint(s) (e.g., a software constraint of software SW) into consideration. To put it simply, any cache line compression method using AI-suggested patterns that can meet at least the hardware constraint falls within the scope of the present invention.

In some embodiments of the present invention, the patterns $PAT_1$-$PAT_N$ may be initialized offline. For example, the AI-suggested patterns $PAT_1$-$PAT_N$ may be determined and written into the cache device 104 during manufacture of the electronic device 100 (or a system-on-chip (SoC) including the cache device 104). After the patterns $PAT_1$-$PAT_N$ are written into the cache device 104 (particularly, compression circuit 114 and decompression circuit 116 of cache device 104), the patterns $PAT_1$-$PAT_N$ may be static (i.e., unchanged) during runtime of the cache memory 112 or may be dynamic (i.e., updated) during runtime of the cache memory 112, depending upon actual design considerations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cache device comprising:

a cache memory, comprising a plurality of cache lines; and a compression circuit, configured to perform a dictionary-based lossless compression upon a compression unit according to at least one pattern selected from a plurality of patterns, and store a compression result of the compression unit into one of the plurality of cache lines, wherein the plurality of patterns are set with the aid of artificial intelligence (AI), and the plurality of patterns are initialized offline.

2. The cache device of claim 1, wherein the cache memory is a system level cache (SLC).

3. The cache device of claim 1, wherein the cache device further transfers the compression result of the compression unit from the cache memory to a hardware device.

4. The cache device of claim 3, wherein the hardware device is a dynamic random access memory (DRAM).

5. The cache device of claim 3, wherein the plurality of patterns are set with the aid of AI that takes a hardware constraint of the hardware device into consideration.

6. The cache device of claim 5, wherein the plurality of patterns are set through reinforcement learning.

7. The cache device of claim 5, wherein the hardware constraint is a dynamic random access memory (DRAM) burst length.

8. The cache device of claim 1, wherein the plurality of patterns are static during runtime of the cache memory.

9. The cache device of claim 1, wherein the plurality of patterns are updated during runtime of the cache memory.

10. A cache line compression method comprising:

setting a plurality of patterns with the aid of artificial intelligence (AI), comprising: initializing the plurality of patterns offline;

performing a dictionary-based lossless compression upon a compression unit according to at least one pattern selected from the plurality of patterns; and storing a compression result of the compression unit into one of a plurality of cache lines in a cache memory.

11. The cache line compression method of claim 10, wherein the cache memory is a system level cache (SLC).

12. The cache line compression method of claim 10, further comprising:

transferring the compression result of the compression unit from the cache memory to a hardware device.

13. The cache line compression method of claim 12, wherein the hardware device is a dynamic random access memory (DRAM).

14. The cache line compression method of claim 12, wherein setting the plurality of patterns with the aid of AI comprises:

setting the plurality of patterns with the aid of AI that takes a hardware constraint of the hardware device into consideration.

15. The cache line compression method of claim 14, wherein the plurality of patterns are set through reinforcement learning.

16. The cache line compression method of claim 14, wherein the hardware constraint is a dynamic random access memory (DRAM) burst length.

17. The cache line compression method of claim 10, further comprising:

keeping the plurality of patterns unchanged during runtime of the cache memory.

18. The cache line compression method of claim 10, further comprising:

updating the plurality of patterns during runtime of the cache memory.

* * * * *